(12) United States Patent
Park et al.

(10) Patent No.: US 8,183,497 B2
(45) Date of Patent: May 22, 2012

(54) APPARATUS FOR AND METHOD OF WELDING SPACER GRID

(75) Inventors: Hak-beum Park, Daejeon (KR);
Byeong-Eun Oh, Daejeon (KR);
Myoung-ho Oh, Daejeon (KR);
Yong-kwan Kim, Daejeon (KR);
Hung-soon Chang, Daejeon (KR);
Chang-hwan Hwang, Daejeon (KR);
Sang-hyun Lim, Daejeon (KR)

(73) Assignee: Korea Nuclear Fuel Co., Ltd., Daejeon (KR)

( * ) Notice: Subject to any disclaimer, the term of this patent is extended or adjusted under 35 U.S.C. 154(b) by 1165 days.

(21) Appl. No.: 11/970,852

(22) Filed: Jan. 8, 2008

(65) Prior Publication Data
US 2009/0084764 A1    Apr. 2, 2009

(30) Foreign Application Priority Data

Sep. 28, 2007 (KR) .................. 10-2007-0098229
Sep. 28, 2007 (KR) .................. 10-2007-0098233

(51) Int. Cl.
*B23K 26/00* (2006.01)
(52) U.S. Cl. .......... 219/121.63; 219/121.78; 219/121.83
(58) Field of Classification Search ............. 219/121.63, 219/121.64, 121.83, 121.78, 121.61
See application file for complete search history.

(56) References Cited

U.S. PATENT DOCUMENTS

| | | | | |
|---|---|---|---|---|
| 4,541,055 A | * | 9/1985 | Wolfe et al. .................. 700/166 |
| 4,566,776 A | * | 1/1986 | Kondoh ........................ 399/274 |
| 4,973,819 A | * | 11/1990 | Thatcher .................. 219/121.78 |
| 5,179,261 A | * | 1/1993 | Perrotti ..................... 219/121.63 |
| 5,359,172 A | * | 10/1994 | Kozak et al. ............. 219/121.64 |
| 5,369,242 A | * | 11/1994 | Hatfield et al. .......... 219/121.63 |
| 5,517,420 A | * | 5/1996 | Kinsman et al. .............. 700/166 |
| 5,726,418 A | * | 3/1998 | Duthoo .................... 219/121.63 |
| 5,808,271 A | * | 9/1998 | Duthoo .................... 219/121.64 |
| 6,236,702 B1 | * | 5/2001 | Chun et al. .................... 376/462 |
| 6,791,057 B1 | * | 9/2004 | Kratzsch et al. ......... 219/121.63 |
| 6,943,086 B2 | * | 9/2005 | Hongo et al. ................. 438/308 |
| 2001/0008231 A1 | * | 7/2001 | Britnell .................... 219/121.63 |
| 2005/0023255 A1 | * | 2/2005 | Yamazaki et al. ....... 219/121.62 |
| 2007/0119829 A1 | * | 5/2007 | Vietz et al. .............. 219/121.63 |
| 2007/0267391 A1 | * | 11/2007 | Song et al. .............. 219/121.64 |

* cited by examiner

*Primary Examiner* — M. Alexandra Elve
(74) *Attorney, Agent, or Firm* — Hershkovitz & Associates, LLC; Abraham Hershkovitz

(57) ABSTRACT

The present invention relates to an apparatus and method for capturing an image of a welding spot during a welding task and determining an accurate position of the welding spot based on the captured image in order to perform an accurate welding task. A beam splitter splits a path of light reflected from a welding section of a spacer grid from a path of a laser beam generated from a laser generator. An image sensor receives light reflected from a welding spot of the spacer grid, and senses and stores an image of the spacer grid. Welding control means controls the image sensor to capture the image of the spacer grid, receives the image of the spacer grind from the image sensor, calculates an accurate position of the welding spot based on the received image, corrects position information of the welding spot based on the calculated position, and controls a servo motor so that the laser generator can accurately collimate the welding spot based on the corrected position value.

10 Claims, 7 Drawing Sheets

[Fig 1]
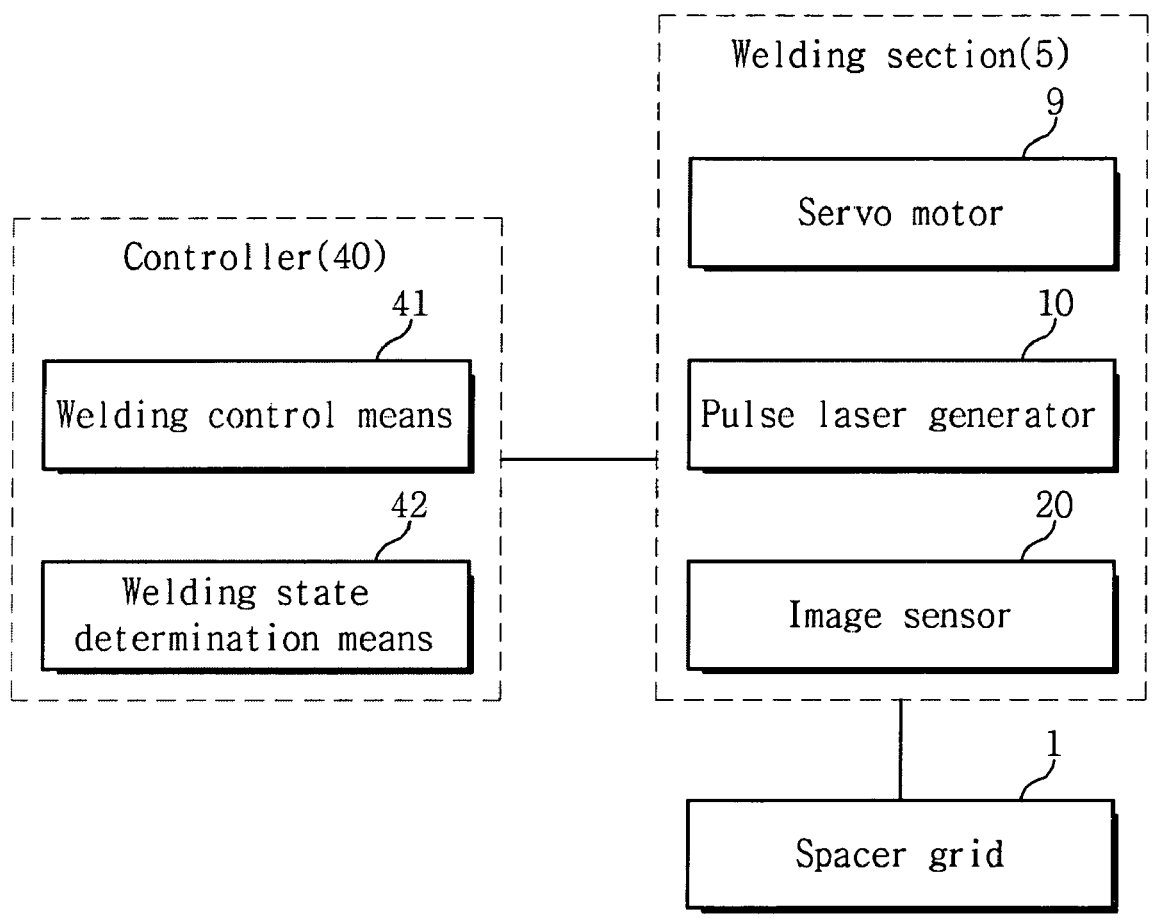

[Fig 2]
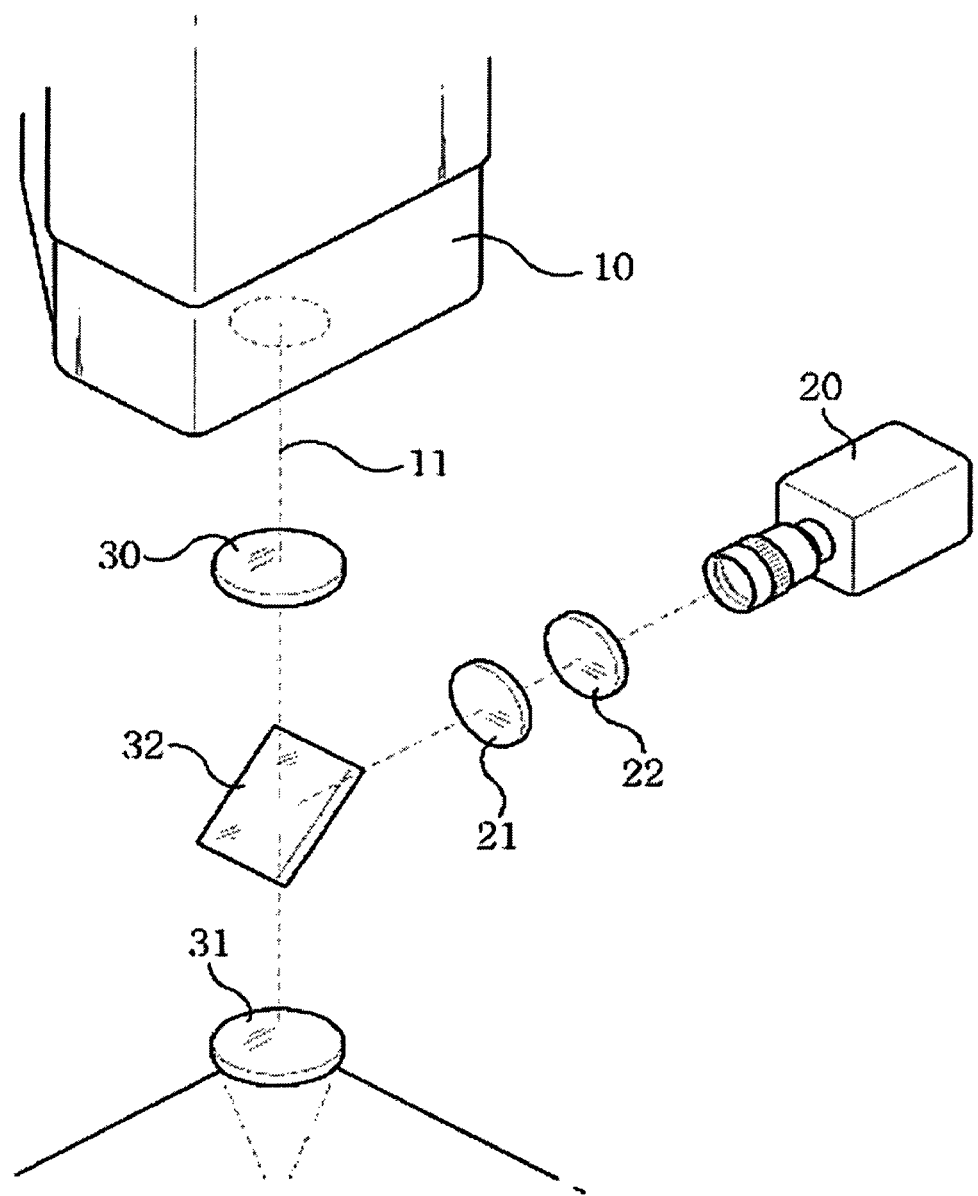

[Fig 3]
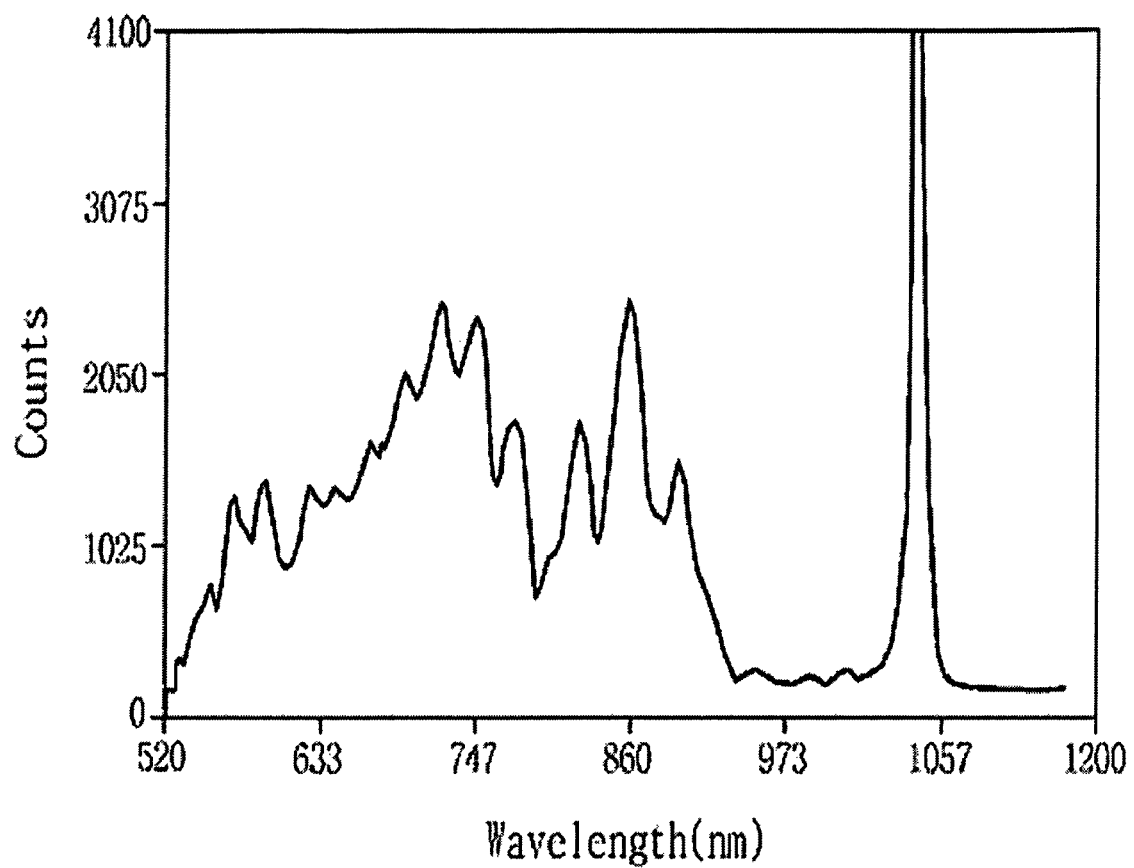

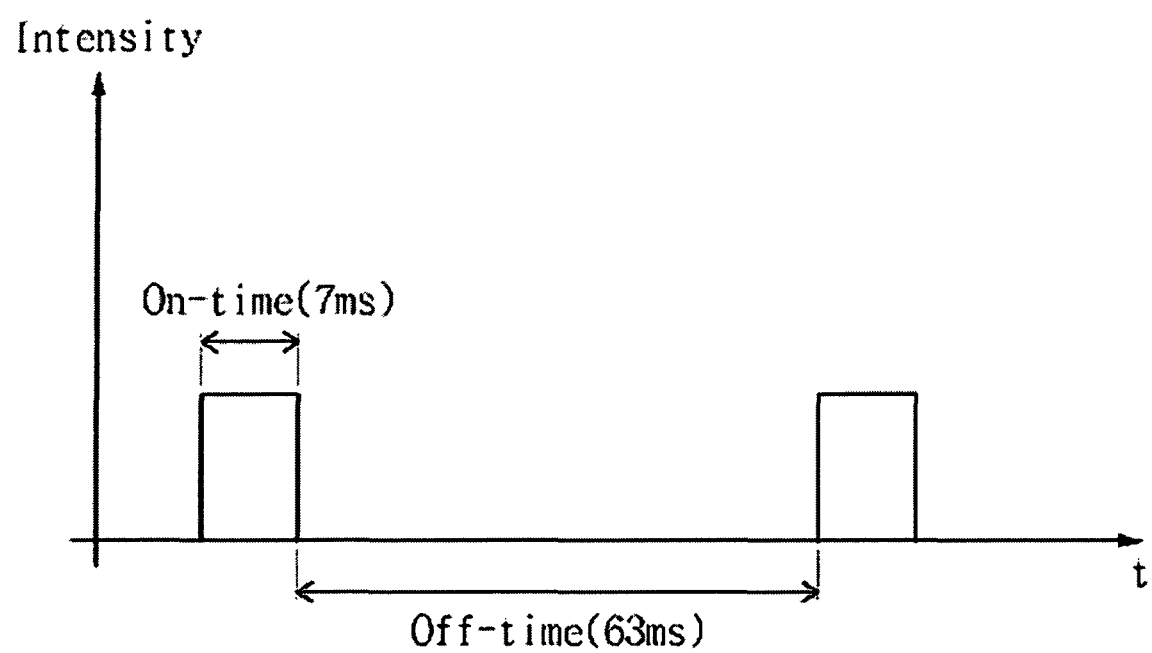
[Fig 4]

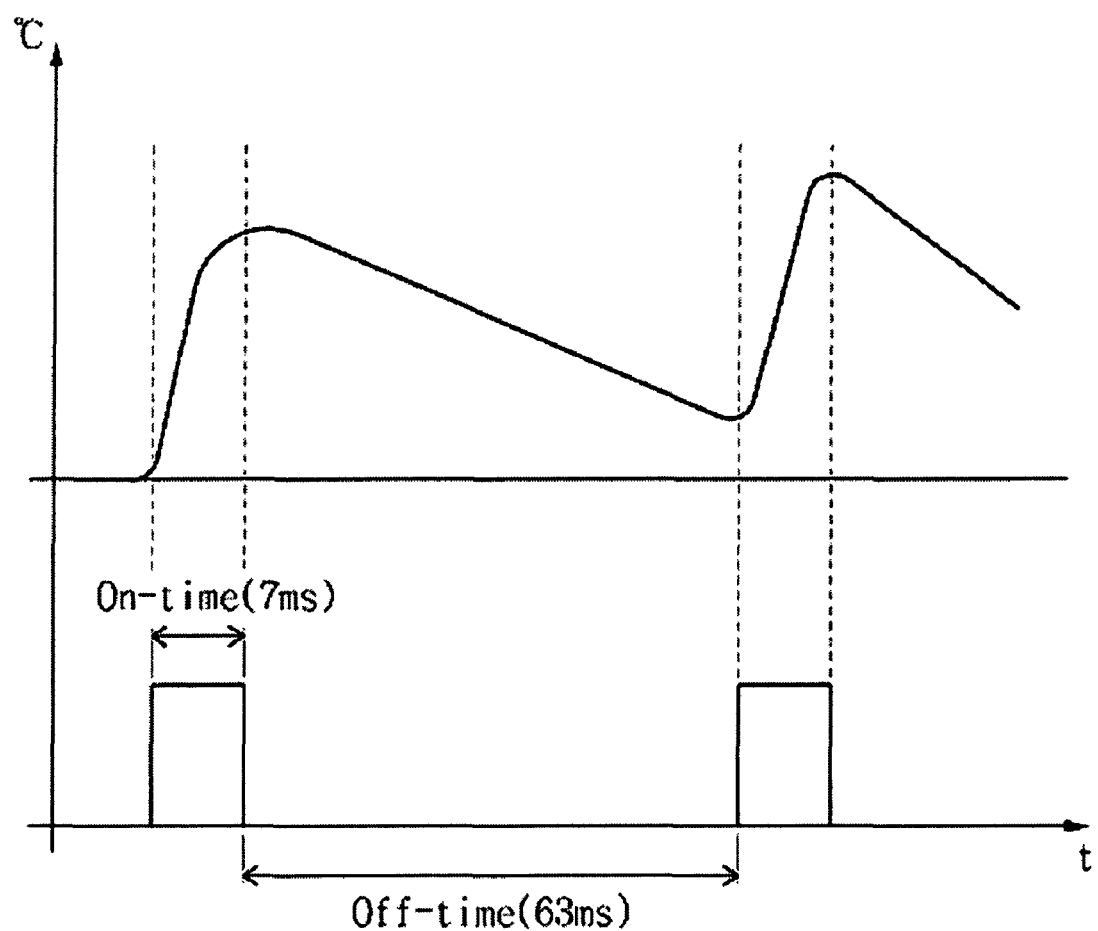
[Fig 5]

[Fig 6]
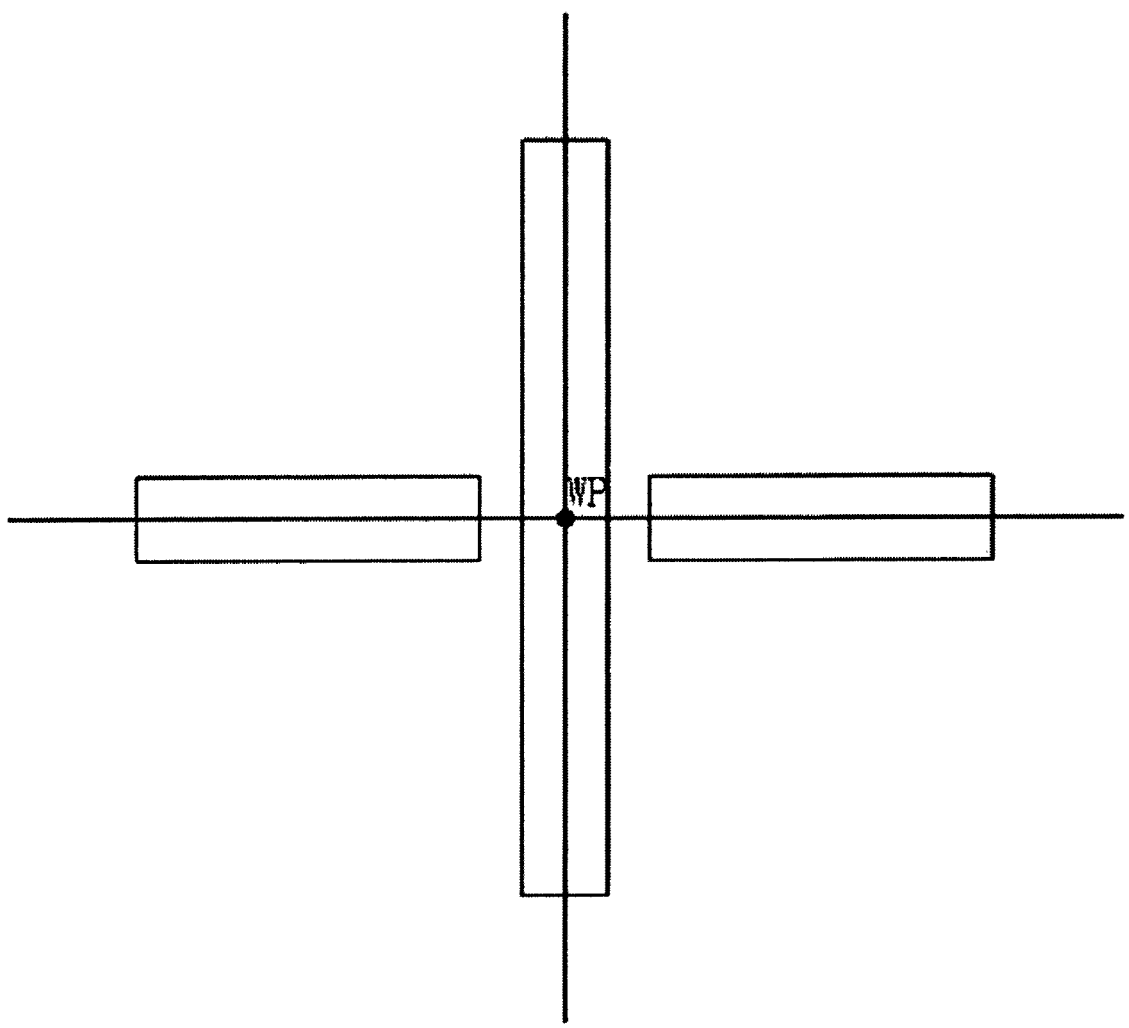

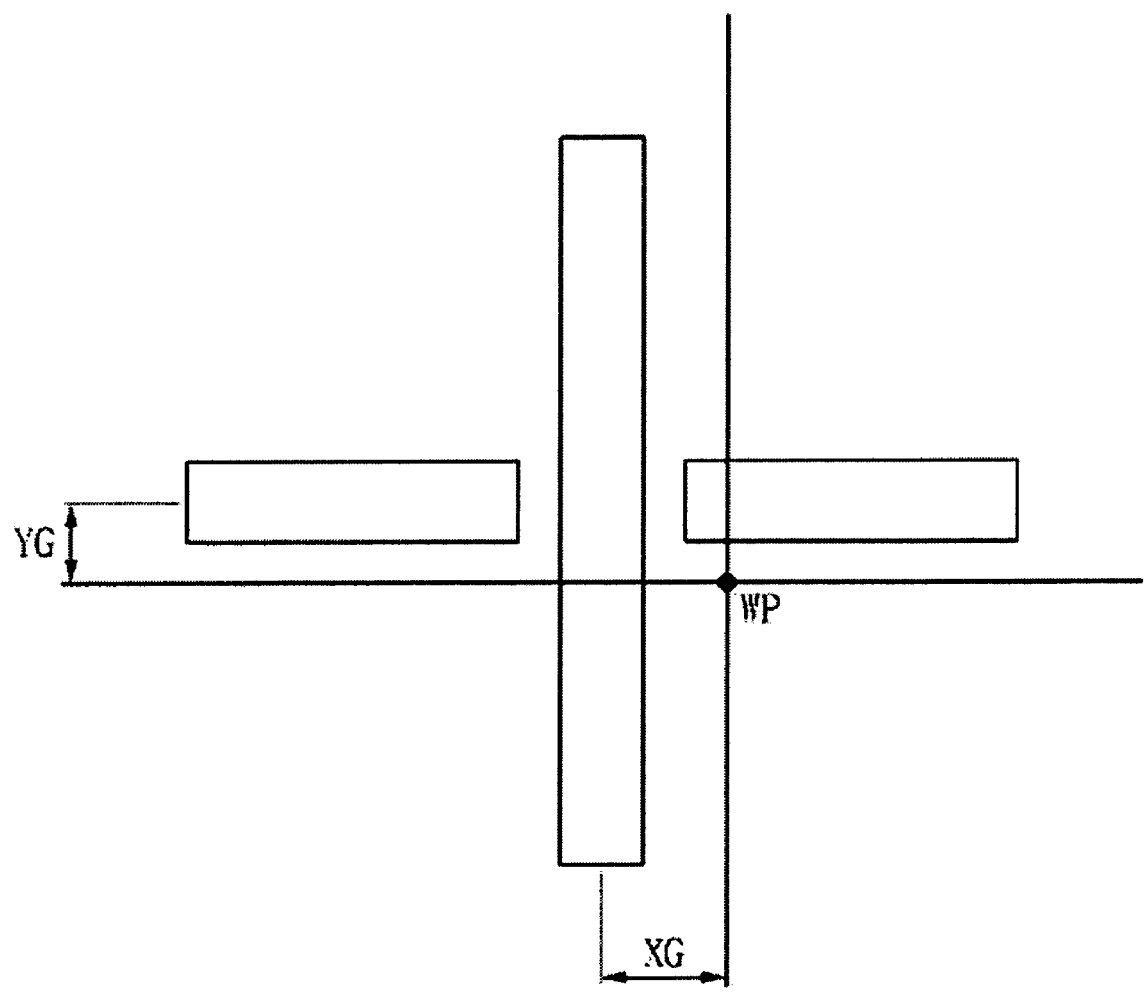
[Fig 7]

APPARATUS FOR AND METHOD OF WELDING SPACER GRID

BACKGROUND OF THE INVENTION

1. Field of the Invention

The present invention relates to an apparatus for and method of welding a spacer grid, and more particularly, to an apparatus and method for capturing an image of a welding spot during a welding task and determining an accurate position of the welding spot based on the captured image in order to perform an accurate welding task.

2. Background of the Related Art

In recent years, a spacer grid used to support and fix a nuclear fuel is formed in a lattice shape by intersecting long plates, which are generally made of zirconium, vertically and horizontally and then performing welding, as disclosed in Korean Patent Application No. 10-1983-0004399. More specifically, each of the plates has grooves formed therein for accommodating the plates that cross each other at right angles. The grooves are fixed in such a manner that they are coupled to one another, and intersections of the plates that cross each other at right angles are then welded to thereby form a spacer grid.

It has been known that defects of a spacer grid during its fabrication includes defective material of plates constituting a spacer grid, fixing defects of plates before welding, laser defects upon welding, fixing defects of retention straps for fixing plates constituting a spacer grid upon welding task, and so on. It has been known that if the several defects occur in combination, it results in welding defects of the spacer grid.

There may be several methods for minimizing the welding defects of the spacer grid depending on various causes. Among them, it is most important to accurately find the intersections of the plates that are orthogonal to one another, which become welding spots, before welding, accurately check the welding state after welding, and then weld spots that have not been properly welded so as to minimize the occurrence of these defects. In particular, when the grooves for inserting the orthogonal plates thereto are inserted into the plates constituting the lattice, there is generated some clearance. Thus, the entire welding spots are not formed regularly and have some error. It is therefore more important to know an accurate position of a welding spot in advance.

In order to prevent the welding defects, in recent years, an image of a spacer grid is captured before a welding task in order to grasp overall welding spots to thereby perform the welding task. A welding state is checked manually after the welding task and a welding task is then re-performed on a defective spacer grid again.

However, this method is problematic in that the time taken before the welding task of the spacer grid is lengthened and it cannot cope with welding defects immediately, thereby decreasing work efficiency.

Meanwhile, the spacer grid is welded at a temperature of 3000° C. or higher using a laser, which is very higher than that of general arc welding. Thus, in order to save the time taken for a welding task, if an image of the spacer grid is captured during or right after the welding task, a hot spot phenomenon in which the image is interfered due to the high temperature is generated. It makes it difficult to read the image. In other words, in order to enhance the efficiency of the welding task of the spacer grid, there is a need for a technique for removing or minimizing hot spots from an image during or right after a welding task.

SUMMARY OF THE INVENTION

Accordingly, the present invention has been made in view of the above problems occurring in the prior art, and it is an object of the present invention to provide a method of acquiring an image of a spacer grid simultaneously with a welding task in order to determine whether to perform a welding task again by immediately checking a welding state after welding.

Another object of the present invention is to provide a method of minimizing the hot spot phenomenon although an image of a spacer grid is captured simultaneously with a welding task.

To achieve the above objects, a laser welding apparatus according to the present invention includes a pulse laser generator, a servomotor, a beam splitter, an image sensor, welding control means, a servo motor, a beam splitter, an image sensor, and welding control means.

The servo motor moves the pulse laser generator on a X-Y plane.

The beam splitter splits a path of light, reflected from a welding section of a spacer grid, from a path of a laser beam generated from the pulse laser generator.

The image sensor receives light, which is reflected from a welding spot of the spacer grid and split at the beam splitter, and senses and stores an image of the spacer grid when the pulse laser generator is in an off state.

The welding control means stores position information about welding spots and a welding sequence of respective welding spots, controls the image sensor to capture the image of the spacer grid, receives the image of the spacer grind from the image sensor, calculates an accurate position of the welding spot based on the received image, corrects position information of the welding spot based on the calculated position, and controls the servo motor so that the pulse laser generator can accurately collimate a next welding spot based on the corrected position value.

The laser welding apparatus according to the present invention may further include a welding state determination means. The welding state determination means determines a welding state of a welded spot by comparing the image of the spacer grid, received from the image sensor, with welding state information previously stored in an image analysis database.

If the welding control means of the laser welding apparatus according to the present invention receives a defect decision signal with respect to a previous welding spot from the welding state determination means, it may control the welding spot to be included in a target welding task list.

The laser welding apparatus according to the present invention may further include an attenuation filter. The attenuation filter weakens an intensity of the light reflected from the spacer grid to the extent that the light can be recognized by a camera and then transfers the light to the image sensor.

The laser welding apparatus according to the present invention may further include a bandpass filter. The bandpass filter allows the light reflected from the spacer grid to selectively transmit therethrough in a wavelength range of 770 to 790 nm, and then transfers the light to the image sensor.

Further, the image sensor of the laser welding apparatus according to the present invention may receive the light reflected from the welding section of the spacer grid only in a low temperature period of off-time of the pulse laser generator, and sense and store the image of the spacer grid.

Further, the image sensor of the laser welding apparatus according to the present invention may sense and store a corresponding frame of frames, which are consecutively photographed during off-time of the pulse laser generator, only when a distorted phenomenon caused by hot spots occurs at a value less than a reference value.

BRIEF DESCRIPTION OF THE DRAWINGS

Further objects and advantages of the invention can be more fully understood from the following detailed description taken in conjunction with the accompanying drawings in which:

FIG. 1 is a block diagram showing an overall construction of a laser welding apparatus according to the present invention;

FIG. 2 is a schematic view illustrating a welding section other than a servo motor of the present invention;

FIG. 3 is a graph showing spectra generated from hot spots on a wavelength basis;

FIG. 4 is a graph showing the amplitudes of a pulse laser according to time; and FIG. 5 is a graph showing temperature at welding spots, which is changed according to a pulse laser.

FIG. 6 is a graph showing an accurate welding point formed at an intersection of each strap constituting a space after correction.

FIG. 7 is a graph showing a welding point before correction.

DETAILED DESCRIPTION OF THE PREFERRED EMBODIMENT

The present invention will now be described in detail in connection with specific embodiments with reference to the accompanying drawings.

Embodiment 1

FIG. 1 is a block diagram showing an overall construction of a laser welding apparatus according to the present invention.

Referring to FIG. 1, the laser welding apparatus according to the present embodiment can be largely divided into a controller 40 and a welding section 5.

The welding section 5 will be first described hereinafter with reference to FIGS. 1 and 2.

The welding section 5 includes a beam splitter, an image sensor, an attenuation filter and a bandpass filter as well as the known laser welding apparatus including a servo motor, a pulse laser generator, a collimation lens and a focus lens.

The servo motor, as known in the art, functions to move the welding section 5 on the X-Y plane.

A laser for welding a spacer grid may employ a laser of a pulse form in which an on state and an off state are repeated, as shown in FIG. 4, in order to sufficiently secure a welding depth and prevent welding defect. It is assumed that a laser of the present embodiment employs a laser of a pulse form having a frequency of 15 Hz, which is generally used to weld a spacer grid. At this time, the cycle of the pulse laser is about 70 ms wherein on-time of the pulse is about 7 ms and off-time thereof is about 63 ms.

If a laser is generated from the pulse laser generator 10, the laser is irradiated on a welding spot through an optical fiber 11, a collimation lens 30, a beam splitter 32 and a focus lens 31.

The beam splitter 32 splits the path of light, reflected from the welding section of the spacer grid, from the path of the laser generated from the pulse laser generator. To split the path of the laser irradiated on the beam splitter 32 and the path of the light reflected from the welding spot from each other, a cold mirror or a hot mirror may be used. FIG. 2 shows an example in which the cold mirror is used as the beam splitter. The cold mirror allow the laser to pass therethrough so that it goes straight, but reflects the light reflected from the welding spot so that it returns to an image sensor 20 to be described later on.

The light, which has been reflected from the welding section of the spacer grid and has its path split from the beam splitter 32, first passes through a filter layer. The filter layer of the present embodiment includes an attenuation filter 21 and a bandpass filter 22.

The attenuation filter functions to entirely weaken the intensity of transmitted light, and has a very high temperature at the welding spot of the spacer grid as described above and thus has a very strong intensity. The attenuation filter functions to weaken the intensity of transmitted light to the extent that it can be recognized by an image sensor 20 to be described later on.

Meanwhile, a wavelength range, which includes information about an image of a spacer grid and also part of visible ray and ultraviolet rays that can be recognized by the naked eyes or a camera, is about 500 to 800 nm. FIG. 3 is a graph showing spectra generated from hot spots of welding spots during a welding task or immediately after a welding task on a wavelength basis. From FIG. 3, it can be seen that the transmittance of the spectra is the smallest near a wavelength of about 780 nm. The wavelength values may be varied depending on the material of a spacer grid that will be welded. For example, in the case of a spacer grid made of a zircaloy material, which is now generally used, a wavelength exhibiting a minimum transmittance upon laser welding is 780 nm. It is meant that a wavelength region having a high transmittance has a high signal generated from a hot spot of a welding spot. This indicates the size of a distorted image of the hot spot. Thus, there is a high possibility that a CCD camera may capture a distorted image. In view of this, when considering only a wavelength with a low transmittance, an image, which is the closest to an actual thing that has not been distorted, can be seen.

In other words, when selectively viewing only the wavelength of 780 nm, an image of the spacer grid from which infrared rays and noise, occurring in a welding spot upon welding have been removed to the greatest extent possible, and which is the closest to an actual thing and has a minimum distortion phenomenon caused by a hot spot, can be obtained. To this end, the bandpass filter 22 allows the transmitted light to selectively pass therethrough in a wavelength range of 770 to 790 nm. It is most preferred that only the wavelength of 780 nm be transmitted, but it is to be understood that the wavelength range of 770 to 790 nm was obtained in consideration of error in a mechanical construction and an actual construction, and so on.

The image sensor 20 will be described hereinafter with reference to FIGS. 2 and 5.

The light that has passed through the filter layer reaches the image sensor 20. The image sensor 20 stores the light, which has reached the image sensor 20 during the off-time (refer to FIG. 3) of the pulse laser generator 10, as an image. The temperature of the spacer grid is low immediately before the pulse laser generator 10 becomes the on-time, as shown in FIG. 5. Thus, it is most preferred that the image be stored right before the on-time, but when considering a mechanical response speed, etc., the image is stored during 17 ms corresponding to about 25% of the end of the off-time (hereinafter, referred to as a "low-temperature period").

The controller 40 will be described hereinafter with reference to FIG. 1.

The controller 40 includes welding control means 41 and welding state determination means 42. The controller 40 can be implemented by combining a program for executing functions, which will be described later on, and a general computer system in which the program can be executed or an operation device specialized in a welding task.

The welding control means 41 functions to control an overall operation of the welding section 5. The welding control means 41 stores therein position information about welding spots and a welding sequence of respective welding spots, and controls the servo motor 9 to move the welding section 5 according to the welding sequence and also controls on or off timing of a laser. Further, the welding control means 41 controls the image sensor 20 to capture an image of a spacer grid during off-time of a laser or the low-temperature period.

A position W of each welding spot stored in the welding control means 41 before a welding task has to be accurately formed at an intersection of each of straps constituting a spacer grid 1 in theory, as shown in FIG. 6. However, the respective straps constituting the spacer grid 1 have grooves formed therein at predetermined intervals in order for the straps to be inserted into the grooves in such a way to cross each other. However, there occurs error as much as YG in the Y axis and XG in the X axis in an actual welding spot due to the clearance of the grooves and other physical causes, as shown in FIG. 7.

To correct this substantial error, the welding control means 41 receives an image captured by the image sensor 20, calculates an accurate position of the welding spot, corrects position information about the welding spot stored in the welding control means 41, and then controls the welding section 5 to perform a welding task based on the corrected position value.

Meanwhile, if a welding state defect signal to be described later on is received, the welding control means 41 uploads corresponding welding defect points on a target welding list so that the welding defect points are welded again.

The welding state determination means 42 functions to determine a welding state of a spot that has already been welded. The welding state determination means 42 determines a welding state of a spot that has been welded right before photographing based on the image of the spacer grid, which is transmitted from the image sensor 20. The welding state determination means 42 is equipped with a database for storing data regarding an image pattern per defect-cause basis. The welding state determination means 42 compares the captured image with the welding defect pattern stored in the database in order to determine a welding state. If the welding state is determined as a defect, the welding state determination means 42 sends a signal, informing that the welding is defect, to the welding control means 41.

Embodiment 2

An embodiment 2 differs from the embodiment 1 in an image acquisition method of the image sensor 20.

In the embodiment 1, an image is preferably stored during the low-temperature period (the last 17 ms period of the off-time). In the embodiment 2, however, a consecutive image is captured during off-time, an image distortion phenomenon caused by hot spots is sensed, and when the distortion phenomenon is less than a reference value, a corresponding frame is stored as an image.

From the constructions of the present invention, the welding method of the present invention can shorten an initial time taken for a welding task and improve work efficiency.

Further, according to the welding method of the present invention, images captured during a welding task are provided in order to immediately determine a welding state. Accordingly, the effort and time taken to check a welding state after welding can be saved and, therefore, an overall work efficiency can be improved.

In addition, according to the present invention, an image is captured when an image distortion phenomenon due to hot spots during a welding task of a spacer grid is minimal. Thus, a phenomenon in which an image is distorted due to a hot spot can be removed to the greatest extent possible based on an image that is captured at the same time.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A spacer grid welding apparatus using a laser, which includes a pulse laser generator, a collimation lens and a focus lens, the spacer grid welding apparatus comprising:
a servo motor configured to move the pulse laser generator on a X-Y plane;
a beam splitter configured to split a path of light, reflected from a welding spot of a spacer grid, from a path of a laser beam generated from the pulse laser generator;
an image sensor configured to receive light, which is reflected from the welding spot of the spacer grid and split at the beam splitter, in a low temperature period of off-time of the pulse laser generator and further configured to sense and store an image of the spacer grid; and
a welding controller configured to store position information about welding spots and a welding sequence of respective welding spots, to control the image sensor to capture the image of the spacer grid, to receive the image of the spacer grid from the image sensor, to calculate an accurate position of the welding spot based on the received image, to correct position information of the welding spot based on the calculated position, and to control the servo motor so that the pulse laser generator can accurately collimate a next welding spot based on the corrected position information.

2. The spacer grid welding apparatus of claim 1, further comprising a welding state determiner configured to determine a welding state of the welding spot by comparing the image of the spacer grid, received from the image sensor, with welding state information previously stored in an image analysis database.

3. The spacer grid welding apparatus of claim 2, wherein if the welding controller receives a welding state defect signal with respect to a previous welding spot from the welding state determiner, the welding controller controls the welding spot to be included in a target welding list.

4. The spacer grid welding apparatus of claim 1, further comprising an attenuation filter configured to weaken an intensity of the light reflected from the spacer grid to the extent that the light can be recognized by a camera and then to transfer the light to the image sensor.

5. The spacer grid welding apparatus of claim 1, further comprising a bandpass filter configured to transmit the light reflected from the spacer grid in a wavelength range of 770 to 790 nm, and then to transfer the light to the image sensor.

6. A spacer grid welding apparatus using a laser, which includes a pulse laser generator, a collimation lens and a focus lens, the spacer grid welding apparatus comprising:

a servo motor configured to move the pulse laser generator on a X-Y plane;

a beam splitter configured to split a path of light, reflected from a welding spot of a spacer grid, from a path of a laser beam generated from the pulse laser generator;

an image sensor configured to receive light reflected from the welding spot of the spacer grid and split at the beam splitter, and sense and store an image of the spacer grid when the extent of distortion of the image caused by hot spots is less than a reference value, the image being a corresponding frame of frames, which are consecutively photographed during off-time of the pulse laser generator; and a welding controller configured to store position information about welding spots and a welding sequence of respective welding spots, control the image sensor to capture the image of the spacer grid, receive the image of the spacer grid from the image sensor, calculate an accurate position of the welding spot based on the received image, correct position information of the welding spot based on the calculated position, and control the servo motor so that the pulse laser generator can accurately collimate a next welding spot based on the corrected position information.

7. The spacer grid welding apparatus of claim 6, further comprising a welding state determiner configured to determine a welding state of the welding spot by comparing the image of the spacer grid, received from the image sensor, with welding state information previously stored in an image analysis database.

8. The spacer grid welding apparatus of claim 7, wherein if the welding controller receives a welding state defect signal with respect to a previous welding spot from the welding state determiner, the welding controller controls the welding spot to be included in a target welding list.

9. The spacer grid welding apparatus of claim 6, further comprising an attenuation filter configured to weaken an intensity of the light reflected from the spacer grid to the extent that the light can be recognized by a camera and then to transfer the light to the image sensor.

10. The spacer grid welding apparatus of claim 6, further comprising a bandpass filter configured to transmit the light reflected from the spacer grid in a wavelength range of 770 to 790 nm, and then to transfer the light to the image sensor.

* * * * *